US011725719B2

(12) United States Patent
Aki et al.

(10) Patent No.: US 11,725,719 B2
(45) Date of Patent: Aug. 15, 2023

(54) GEAR WHEEL MECHANISM AND MANUFACTURING METHOD FOR A GEAR WHEEL MECHANISM

(71) Applicant: SONY CORPORATION, Tokyo (JP)

(72) Inventors: Yuichi Aki, Tokyo (JP); Fujio Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 250 days.

(21) Appl. No.: 17/250,550

(22) PCT Filed: Aug. 1, 2019

(86) PCT No.: PCT/JP2019/030220
§ 371 (c)(1),
(2) Date: Feb. 2, 2021

(87) PCT Pub. No.: WO2020/031843
PCT Pub. Date: Feb. 13, 2020

(65) Prior Publication Data
US 2021/0293317 A1 Sep. 23, 2021

(30) Foreign Application Priority Data
Aug. 10, 2018 (JP) .................... 2018-151277

(51) Int. Cl.
*F16H 49/00* (2006.01)
*B29C 45/14* (2006.01)
(Continued)

(52) U.S. Cl.
CPC .......... *F16H 49/001* (2013.01); *B29C 45/14* (2013.01); *F16H 55/06* (2013.01); *F16H 55/17* (2013.01);
(Continued)

(58) Field of Classification Search
CPC ............ F16H 49/001; F16H 2055/065; F16H 2055/176; B29C 45/14
See application file for complete search history.

(56) References Cited

U.S. PATENT DOCUMENTS 6,230,587 B1    5/2001  Grill
2002/0174741 A1* 11/2002 Kobayashi ............ F16H 57/041
                                                            74/640
(Continued)

FOREIGN PATENT DOCUMENTS

DE        19835571 A1    2/2000
EP         0978667 A2    2/2000
(Continued)

OTHER PUBLICATIONS

International Search Report and Written Opinion of PCT Application No. PCT/JP2019/030220, dated Oct. 29, 2019, 11 pages of ISRWO.

*Primary Examiner* — Terence Boes
(74) *Attorney, Agent, or Firm* — Chip Law Group

(57) ABSTRACT

This gear wheel mechanism includes a rotator, a first gear wheel, a second gear wheel, and a reinforcement member. The rotator is configured to be rotatable about a rotation shaft and has an elliptical shape as viewed in an axis direction of the rotation shaft. The first gear wheel includes a first base portion including a first outer circumferential surface and a first inner circumferential surface and having a hollow cylindrical shape configured to be deformable by the rotator being inserted in the axis direction of the rotation shaft and external teeth formed in the outer circumferential surface. The second gear wheel includes a second base portion including a second outer circumferential surface and a second inner circumferential surface and having a hollow cylindrical shape disposed to cover the external teeth and internal teeth which are formed at positions facing the
(Continued)

external teeth of the second inner circumferential surface, with which the external teeth are partially engaged in accordance with deformation of the first base portion by rotation of the rotator. The reinforcement member is disposed in contact with a region of the second outer circumferential surface corresponding to a region in which the internal teeth of the second inner circumferential surface are formed.

15 Claims, 10 Drawing Sheets

(51) Int. Cl.
    *F16H 55/06*     (2006.01)
    *F16H 55/17*     (2006.01)
    *B29L 15/00*     (2006.01)

(52) U.S. Cl.
    CPC ... *B29L 2015/003* (2013.01); *F16H 2049/003* (2013.01); *F16H 2055/065* (2013.01); *F16H 2055/176* (2013.01)

(56) References Cited

U.S. PATENT DOCUMENTS

| | | | |
|---|---|---|---|
| 2012/0227529 A1* | 9/2012 | Fischer | F16H 55/06 74/434 |
| 2021/0293317 A1* | 9/2021 | Aki | F16H 55/06 |
| 2021/0348679 A1* | 11/2021 | Ling | F16H 55/0833 |
| 2021/0381588 A1* | 12/2021 | Ling | F16H 55/17 |

FOREIGN PATENT DOCUMENTS

| | | | | |
|---|---|---|---|---|
| JP | H09303500 A | 11/1997 | | |
| JP | H11303977 A | 11/1999 | | |
| JP | 2000-065163 A | 3/2000 | | |
| JP | 2004513306 | * 4/2004 | | F16H 49/001 |
| JP | 2004-286219 A | 10/2004 | | |
| JP | 2006-002805 A | 1/2006 | | |
| JP | 2006-046369 A | 2/2006 | | |
| JP | 2006-132726 A | 5/2006 | | |
| JP | 2015-102110 A | 6/2015 | | |

* cited by examiner

GEAR WHEEL MECHANISM AND MANUFACTURING METHOD FOR A GEAR WHEEL MECHANISM

CROSS REFERENCE TO RELATED APPLICATIONS

This application is a U.S. National Phase of International Patent Application No. PCT/JP2019/030220 filed on Aug. 1, 2019, which claims priority benefit of Japanese Patent Application No. JP 2018-151277 filed in the Japan Patent Office on Aug. 10, 2018. Each of the above-referenced applications is hereby incorporated herein by reference in its entirety.

TECHNICAL FIELD

The present technology relates to a gear wheel mechanism that can be applied to a wave speed reducer and to a manufacturing method for a gear wheel mechanism.

BACKGROUND ART

Patent Literature 1 describes a harmonic speed reducer (wave speed reducer). In the harmonic speed reducer described in Patent Literature 1, a flexspline and a circular spline are each made of resin. Accordingly, wear resistance and long life are achieved (paragraphs [0024] and [0025], FIG. 1, and the like of Patent Literature 1).

CITATION LIST

Patent Literature

Patent Literature 1: Japanese Patent Application Laid-open No. 2006-132726

DISCLOSURE OF INVENTION

Technical Problem

It is desirable to provide a technology capable of providing high driving torque and high rotational accuracy in a wave speed reducer.

In view of the above-mentioned circumstances, it is an object of the present technology to provide a gear mechanism capable of providing high driving torque and high rotational accuracy, and a manufacturing method for a gear mechanism.

Solution to Problem

In order to accomplish the above-mentioned object, a gear wheel mechanism according to an embodiment of the present technology includes a rotator, a first gear wheel, a second gear wheel, and a reinforcement member.

The rotator is configured to be rotatable about a rotation shaft and has an elliptical shape as viewed in an axis direction of the rotation shaft.

The first gear wheel includes a first base portion including a first outer circumferential surface and a first inner circumferential surface and having a hollow cylindrical shape configured to be deformable by the rotator being inserted in the axis direction of the rotation shaft and external teeth formed in the outer circumferential surface.

The second gear wheel includes a second base portion including a second outer circumferential surface and a second inner circumferential surface and having a hollow cylindrical shape disposed to cover the external teeth and internal teeth which are formed at positions facing the external teeth of the second inner circumferential surface, with which the external teeth are partially engaged in accordance with deformation of the first base portion by rotation of the rotator.

The reinforcement member is disposed in contact with a region of the second outer circumferential surface corresponding to a region in which the internal teeth of the second inner circumferential surface are formed.

In this gear wheel mechanism, the reinforcement member is provided in the second outer circumferential surface of the second base portion of the second gear wheel. The reinforcement member is disposed in contact with the region of the second outer circumferential surface corresponding to the region in which the internal teeth of the second inner circumferential surface are formed. Accordingly, high driving torque and high rotation accuracy can be provided.

The rotator may include a wave generator. In this case, the first gear wheel may include a flexspline. Further, the second gear wheel may include a circular spline.

At least one of the first gear wheel or the second gear wheel may include resin.

The reinforcement member may be disposed in an annular shape outside the region in which the internal teeth of the second inner circumferential surface are formed, so as to surround the second outer circumferential surface.

The reinforcement member may have an annular shape as viewed in the axis direction of the rotation shaft.

The reinforcement member may have rigidity higher than rigidity of the second gear wheel.

The reinforcement member may be metal or ceramic.

The second gear wheel may include a support portion that is configured integrally with the second base portion and forms a recess portion in which the reinforcement member is disposed.

The second gear wheel may be constituted by a thin-wall structure having a substantially uniform thickness.

At least one of the first gear wheel or the second gear wheel may include a plating layer formed on a surface.

The plating layer may include at least one of an electroless plating layer or an electroplating layer.

The second base portion may include a side wall portion having an annular shape as viewed in the axis direction of the rotation shaft and a lid portion that covers the side wall portion. In this case, the internal teeth may be formed in an inner circumferential surface of the side wall portion.

The reinforcement member may be held in contact with an outer circumferential surface of the side wall portion.

The outer circumferential surface of the side wall portion may be configured to be oblique so as to be closer to the rotation shaft as the outer circumferential surface approaches the lid portion.

The reinforcement member may include a tapered surface that is brought into contact with the outer circumferential surface.

A manufacturing method for the gear wheel mechanism according to another embodiment of the present technology includes integrally forming, by insert molding with resin, a circular spline and a reinforcement member, the reinforcement member being disposed in contact with an outside of a region in which internal teeth of the circular spline are formed.

The circular spline with which the reinforcement member is held in contact, a wave generator, and a flexspline are assembled.

The manufacturing method for the gear wheel mechanism may further include a step of forming the flexspline by injection molding with resin.

A manufacturing method for a gear wheel mechanism according to another embodiment of the present technology includes temporarily assembling a wave generator, a flexspline, and a circular spline and driving the temporarily assembled wave generator, flexspline, and circular spline.

Backlash between the flexspline and the circular spline is measured.

A plating thickness is determined on the basis of a measurement result of the backlash and at least one of the flexspline or the circular spline is plated.

The manufacturing method for the gear wheel mechanism may further include assembling a wave generator, a flexspline, and a circular spline after the plating step ends. Further, a reinforcement member may be disposed in contact with an outside of a region in which internal teeth of the circular spline are formed.

Advantageous Effects of Invention

As described above, in accordance with the present technology, high driving torque and high rotation accuracy can be provided. It should be noted that the effects described here are not necessarily limitative and any effect described in the present disclosure may be provided.

MODE(S) FOR CARRYING OUT THE INVENTION

Hereinafter, embodiments according to the present technology will be described with reference to the drawings.

First Embodiment

[Driving Principle of Wave Speed Reducer]

Figure 1:
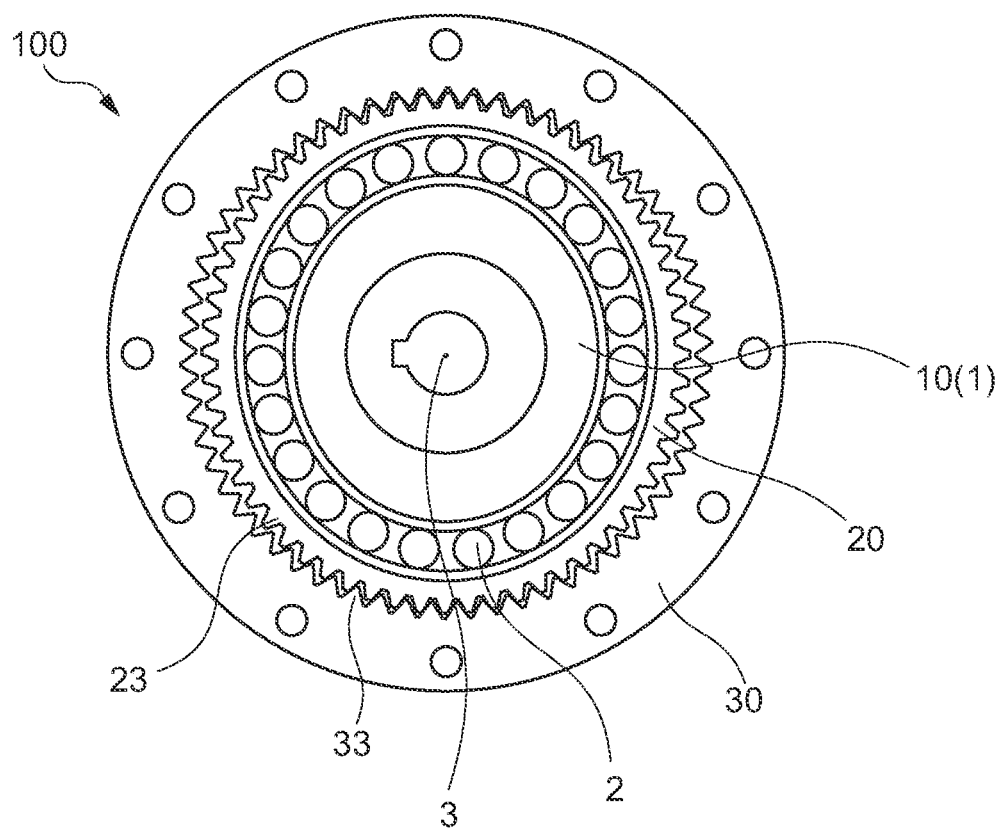
FIG. 1 A schematic diagram for describing a driving principle of a wave speed reducer according to a first embodiment.

FIG. 1 is a schematic diagram for describing a driving principle of a wave speed reducer according to a first embodiment of the present technology.

A wave speed reducer 100 includes a wave generator 10, a flexspline 20, and a circular spline 30. Each of the wave generator 10, the flexspline 20, and the circular spline 30 is configured using a predetermined shaft 3 as a reference.

The wave generator 10 has an elliptical cam 1 and a bearing 2. The cam 1 is configured to be rotatable using the predetermined shaft 3 as a rotation axis. For example, an input shaft (not shown) and the cam 1 are connected to each other and rotational force is applied to the input shaft. Accordingly, the elliptical cam 1 is rotated about the predetermined shaft 3. Hereinafter, the predetermined shaft 3 will be referred to as a rotation shaft 3 using the same reference sign.

The bearing 2 is disposed on an outer circumference of the elliptical cam 1. As viewed in an axial direction of the rotation shaft 3, the general shape of the wave generator 10 including the bearing 2 is an elliptical shape corresponding to the shape of the cam 1. That is, a long axis direction of the cam 1 and a long axis direction of the wave generator 10 are the same direction. Moreover, a short axis direction of the cam 1 and a short axis direction of the wave generator 10 are the same direction. It should be noted that in the example shown in FIG. 1, a ball bearing having a plurality of balls is configured as the bearing 2. The present technology is not limited thereto, another configuration such as a plain bearing with no balls may be employed as the bearing 2.

When the cam 1 rotates about the rotation shaft 3, the bearing 2 also rotates in the same direction of rotation about the rotation shaft 3. Accordingly, the entire wave generator 10 also rotates about the rotation shaft 3 in accordance with the rotation of the cam 1.

The flexspline 20 has an annular shape as viewed in the axial direction of the rotation shaft 3 and is disposed to be rotatable about the rotation shaft 3 (the details of the general shape will be described later). The flexspline 20 includes a first inner circumferential surface 21, a first outer circumferential surface 22, and external teeth 23 formed on the first outer circumferential surface 22. A circular space is formed inside the first inner circumferential surface 21 of the flexspline 20. The external teeth 23 are formed at equal pitches in a circumferential direction of the first outer circumferential surface 22.

The flexspline 20 has flexibility and is configured to be elastically deformable. As shown in FIG. 1, the flexspline 20 is configured to be deformable when the wave generator 10 is inserted (fitted) into the space inside the first inner circumferential surface 21 in the axial direction of the rotation shaft 3. When the wave generator 10 is inserted, the flexspline 20 deforms to match the shape of the wave generator 10.

As shown in FIG. 1, as viewed in the axial direction of the rotation shaft 3, the shape of the flexspline 20 is an elliptical shape. The long and short axis directions of the flexspline 20 after deformation are the same direction as the long and short axis directions of the wave generator 10.

Moreover, in this embodiment, an output shaft (not shown) is connected to the flexspline 20. When the flexspline 20 rotates about the rotation shaft 3, its rotational force (rotational torque) is output from the output shaft.

The circular spline 30 has an annular shape as viewed in the axial direction of the rotation shaft 3 and is disposed and fixed about the rotation shaft 3 (the details of the general shape will be described later). The circular spline 30 has a second inner circumferential surface 31, a second outer circumferential surface 32, and internal teeth 33 formed on the second inner circumferential surface 31. The internal teeth 33 are formed at positions facing the external teeth 23 of the flexspline 20 and are formed at equal pitches along the circumferential direction of the second inner circumferential surface 31.

As shown in FIG. 1, the circular spline 30 is designed such that the external teeth 23 located in a long axis direction of the flexspline 20 deformed in the elliptical shape is engaged with the internal teeth 33. That is, the circular spline 30 is designed such that the external teeth 23 are partially engaged with the internal teeth 33 in accordance with the deformation of the flexspline 20. When the wave generator 10 rotates, the long axis direction of the flexspline 20 changes, such that the positions of the external teeth 33 engaged with the internal teeth 23 also change.

In this embodiment, the number of teeth of the external teeth 23 of the flexspline 20 is smaller than the number of teeth of the internal teeth 33 of the circular spline 30 by 2. It should be noted that the number of teeth of the internal teeth 23 and the external teeth 33 is not limited, and may be arbitrarily set such that an arbitrary deceleration ratio can be achieved.

When the input shaft (not shown) is rotated, the wave generator 10 rotates about the rotation shaft 3. Accordingly, the flexspline 20 is elastically deformed, and the positions at which the external teeth 23 of the flexspline 20 mesh with the internal teeth 33 of the circular spline 30 change. That is, in the long axis direction of the rotating cam 1, the external teeth 23 of the flexspline 20 mesh with the internal teeth 33 of the circular spline 30. On the other hand, the external teeth 33 and the internal teeth 23 are separated from each other in the short axis direction of the cam 1.

The number of teeth of the external teeth 23 of the flexspline 20 and the number of teeth of the internal teeth 33 of the circular spline 30 are different from each other. Thus, each time the wave generator 10 rotates one turn, the flexspline 20 rotates in a direction opposite to the direction of rotation of the wave generator 10 by an amount corresponding to the difference in the number of teeth. In this embodiment, each time the wave generator 10 rotates one turn, the flexspline 20 rotates in the opposite direction by an amount corresponding to two teeth. Accordingly, it is possible to reduce the rotational torque input to the input shaft and output the reduced rotational torque from the output shaft.

It should be noted that the flexspline 20 may be fixed, the circular spline 30 may be configured to be rotatable, and the output shaft may be connected to the circular spline 30. Also in this case, it is possible to reduce the rotational torque input to the input shaft and output the reduced rotational torque from the output shaft.

[Configuration of Wave Speed Reducer]

A specific configuration example of the wave speed reducer 100 according to this embodiment will be described.

In this embodiment, the wave speed reducer 100 corresponds to an embodiment of a gear mechanism according to the present technology.

Figure 2B:
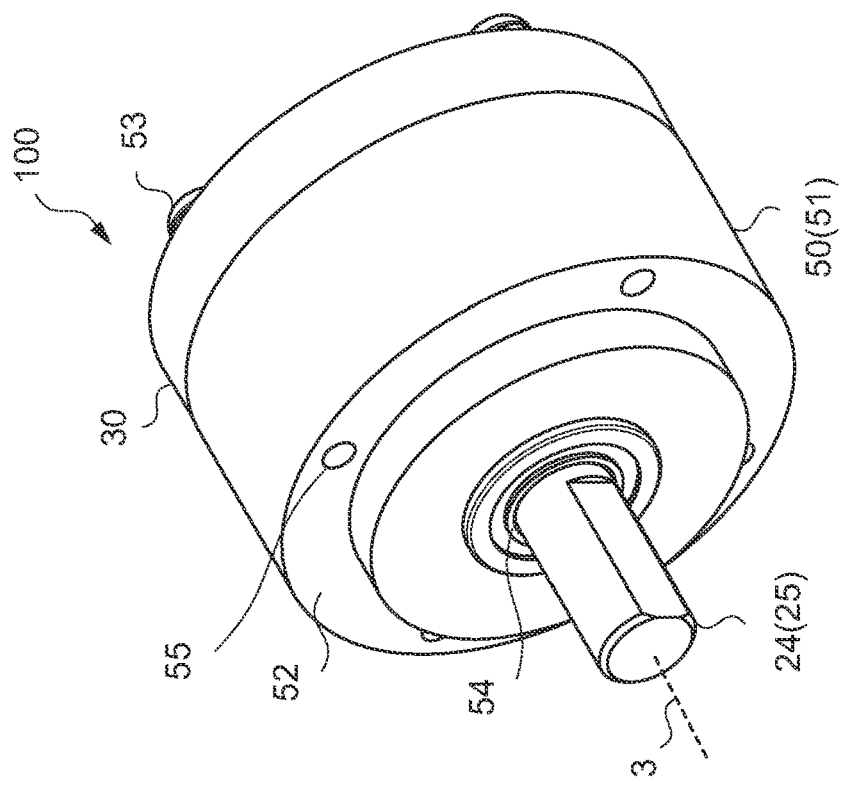
FIGS. 2A and 2B A perspective view showing an appearance example of the wave speed reducer.
Figure 2A:
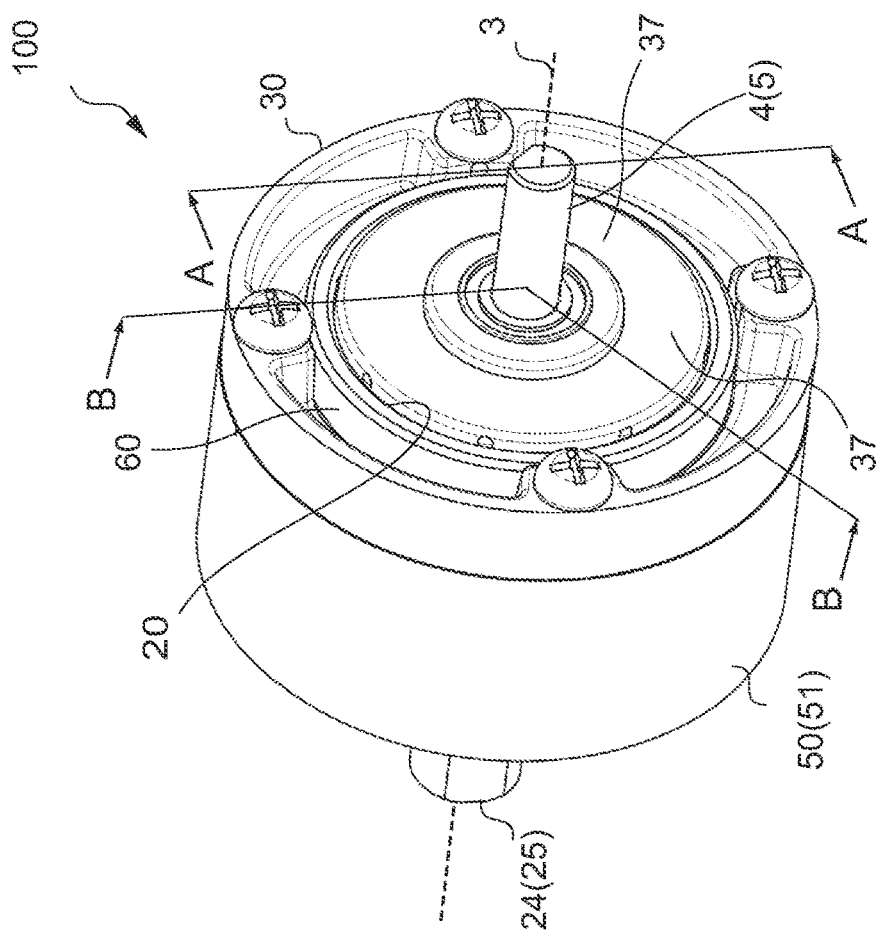
Figure 3:
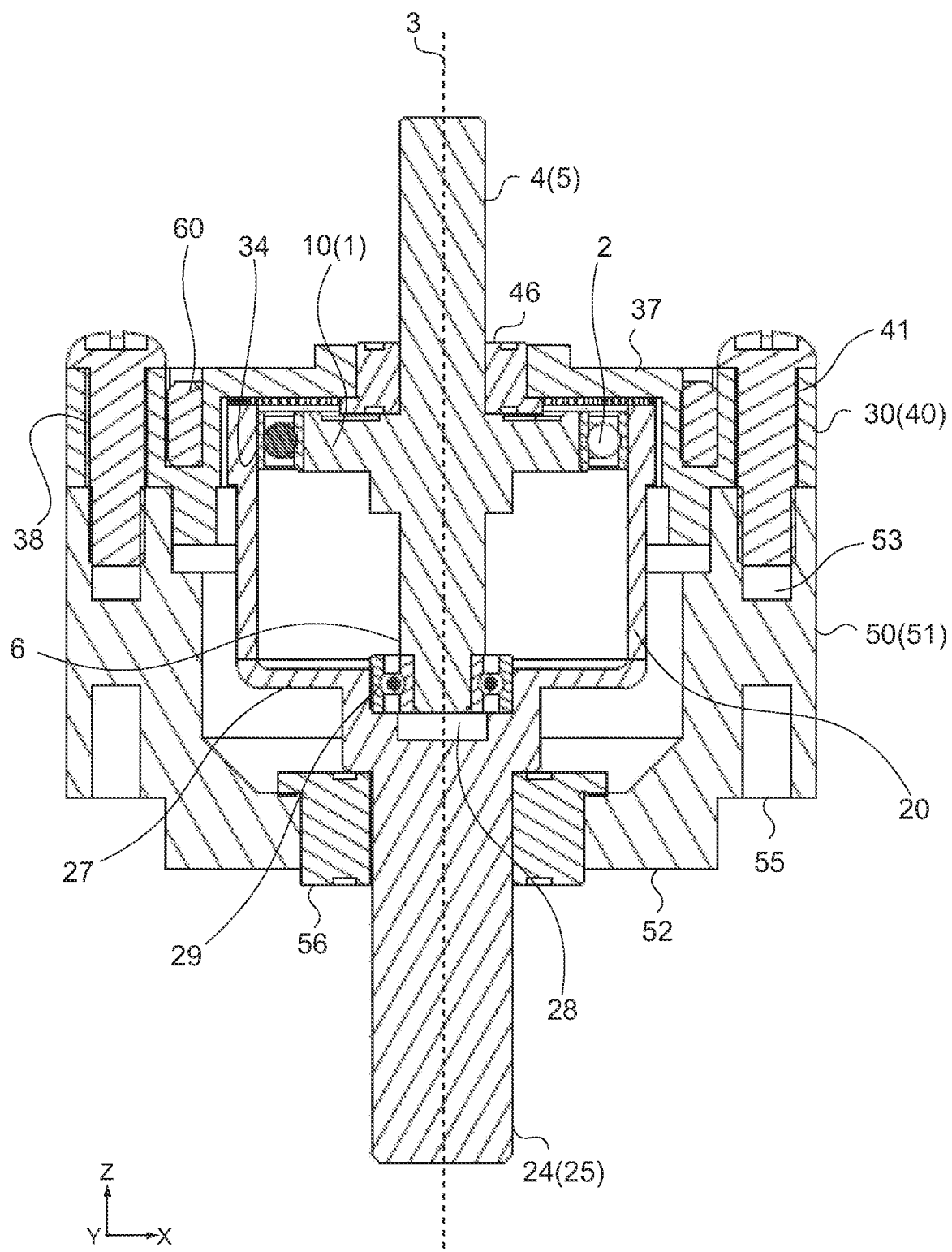
FIG. 3 A cross-sectional view taken along the line A-A of FIG. 2A.

FIGS. 2A and 2B are perspective views showing an appearance example of the wave speed reducer 100. FIG. 3 is a cross-sectional view taken along the line A-A of FIG. 2A.

Here, for the sake of convenience, it is assumed that the Z direction in the figure corresponds to upper and lower directions of the wave speed reducer 100. The description will be given assuming that the side shown in FIG. 2A is an upper side of the wave speed reducer 100 and the side shown in FIG. 2B is a lower side of the wave speed reducer 100. As a matter of course, the orientation and the like when the wave speed reducer 100 is used are not limited.

As shown in FIGS. 2A, 2B, and 3, the wave speed reducer 100 includes an input shaft 4, an output shaft 24, a base portion 50, the wave generator 10, the flexspline 20, the circular spline 30, and a reinforcement member 60. The respective members are each configured using the rotation shaft 3 of the wave generator 10 as the center.

As shown in FIGS. 2A and 2B, the input shaft 4 is provided at the center on the upper side of the wave speed reducer 100 so as to extend in the axial direction of the rotation shaft 3 (hereinafter, sometimes simply referred to as the axial direction). As shown in FIG. 3, a first shaft portion 5 extending in the axial direction is connected to the center on the upper side of the wave generator 10. A second shaft portion 6 extending in the axial direction is connected to the center on the lower side of the wave generator 10. The first shaft portion 5 and the second shaft portion 6 are configured to be rotatable integrally with the wave generator 10.

In this embodiment, the first shaft portion 5 provided on the upper side of the wave generator 10 functions as the input shaft 4. When the rotational torque is input to the first shaft portion 5, a wave generator 10 and the first shaft portion 5 and the second shaft portion 6 integrally rotate about the rotation shaft 3.

As shown in FIGS. 2A and 2B, the output shaft 24 is provided at the center on the lower side of the wave speed reducer 100 so as to extend in the axial direction. As shown in FIG. 3, a shaft portion 25 extending in the axial direction is connected to the center on a lower side of the flexspline 20. The shaft portion 25 is formed integrally with the flexspline 20 and rotates integrally with the flexspline 20.

In this embodiment, the shaft portion 25 provided on the lower side of the flexspline 20 functions as the output shaft 24. When the flexspline 20 rotates about the rotation shaft 3, its rotational torque is output from the output shaft 24.

The base portion 50 has a hollow cylindrical shape formed using the rotation shaft 3 as the center. The base portion 50 has a side wall portion 51 centered on the rotation shaft 3 and a bottom portion 52 covering a lower side of the side wall portion 51. An upper side of the base portion 50 is an opening.

The side wall portion 51 has an annular shape as viewed in the axial direction. Therefore, the opening on the upper side of the base portion 50 has a circular shape. As shown in FIGS. 2A, 2B, and 3, four screw holes 53 formed at intervals of 90 degrees are formed in an upper surface of the side wall portion 51.

A through-hole 54 is formed at the center of a bottom surface 51 of the base portion 50. Moreover, four mounting holes 55 formed at intervals of 90 degrees are formed in an edge portion of the bottom surface 52. The four mounting holes 55 are used in a case where the wave speed reducer 100 is mounted in place, for example. As a matter of course, the mounting holes 55 may be used for other purposes.

Figure 4:
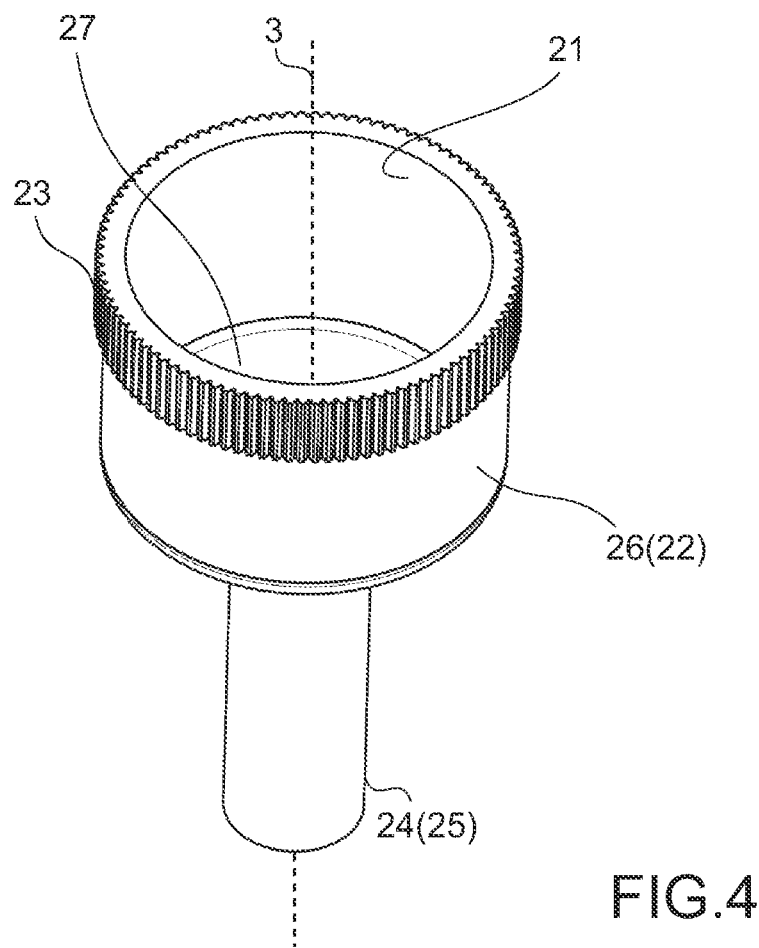
FIG. 4 A perspective view showing a configuration example of a flexspline.

FIG. 4 is a perspective view showing a configuration example of the flexspline 20. The flexspline 20 has a hollow cylindrical shape formed using the rotation shaft 3 as the center. The flexspline 20 has a side wall portion 26 centered on the rotation shaft 3 and a bottom portion 27 covering a lower side of the side wall portion 26. An upper side of the flexspline 20 is an opening.

The side wall portion 26 has an annular shape as viewed in the axial direction. Therefore, the opening on the upper side of the flexspline 20 has a circular shape. An outer circumferential surface of the side wall portion 26 corresponds to the first outer circumferential surface 22 shown in FIG. 1. An inner circumferential surface of the side wall portion 26 corresponds to the first inner circumferential surface 21 shown in FIG. 1. The wave generator 10 is inserted in the axial direction into the space surrounded by the side wall 26 and the bottom portion 27. Accordingly, the shape of the flexspline 20 as viewed in the axial direction is deformed in the elliptical shape.

As shown in FIG. 4, the external teeth 23 are formed on an upper side of the side wall portion 26 along the circumference of the first outer circumferential surface 22. The external teeth 23 are formed such that its upper end is at the same position as the upper end of the side wall portion 26.

The shaft portion 25 is formed at the center of the bottom portion 27 of the flexspline 20 so as to extend in the axial direction. As described above, the shaft portion 25 functions as the output shaft. In this embodiment, the flexspline 20 and the shaft portion 25 are integrally formed by injection molding with resin.

The resin material is not limited, and any resin material may be used. For example, a resin material such as engineering plastic or super engineering plastic may be used. For example, the resin material is selected as appropriate in accordance with use conditions such as temperature at which the flexspline 20 is used and revolutions per minute.

In this embodiment, a first base portion is realized by the side wall portion 26 and the bottom portion 27. Moreover, a first gear is realized by the flexspline 20 including the side wall portion 26, the bottom portion 27, and the external teeth 23.

As shown in FIG. 3, the flexspline 20 and the shaft portion 25 are inserted into the base portion 50 in the axial direction. The shaft portion 25 formed in the bottom portion 27 of the flexspline 20 is inserted into the through-hole 54 formed at the center of the bottom portion 52 of the base portion 50. The shaft portion 25 is rotatably supported to the base portion 50 through a bearing portion 56 disposed on the bottom portion 52 of the base portion 50. The configuration of the bearing portion 56 is not limited and may be arbitrarily designed.

The wave generator 10 is inserted into the flexspline 20 in the axial direction. The wave generator 10 is inserted so as to come into contact with the first inner circumferential surface 21 of the side wall portion 26 inside the region in which the external teeth 23 are formed.

As shown in FIG. 3, a recess portion 28 is formed at the center on an inner circumferential side of the bottom portion 27 of the flexspline 20. The tip of the second shaft portion 6 connected to the lower side of the wave generator 10 is connected to the recess portion 28 via a bearing portion 29. The second shaft portion 6 is rotatably supported to the flexspline 20.

Figure 5:
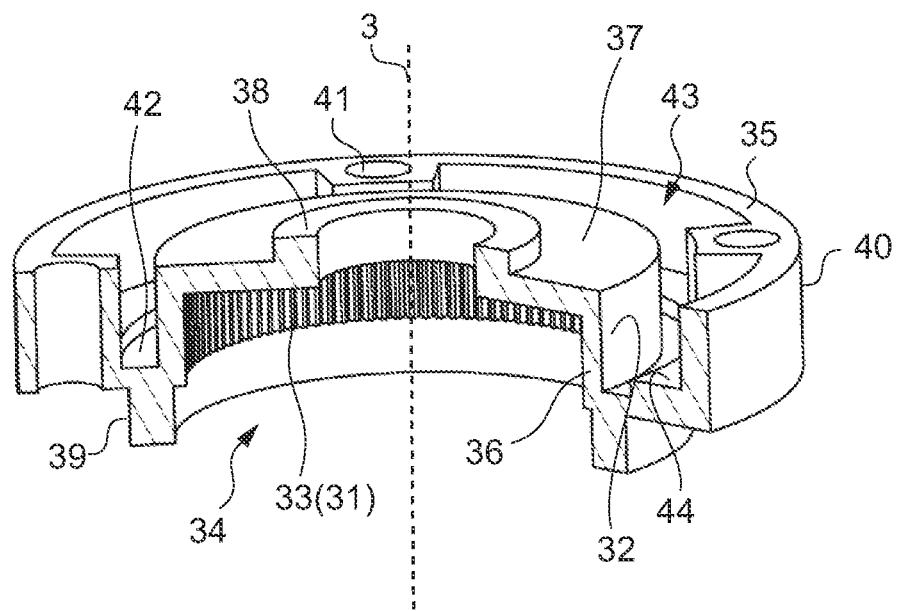
FIG. 5 A cross-sectional view showing a configuration example of a circular spline.

FIG. 5 is a cross-sectional view showing a configuration example of the circular spline 30. In FIG. 5, a cross-sectional view taken along the line B-B shown in FIG. 2A is shown. The circular spline 30 includes a gear portion 34 and a support portion 35.

The gear portion 34 has a hollow cylindrical shape formed using the rotation shaft 3 as the center. The gear portion 34 includes a side wall portion 36 centered on the rotation axis and a lid portion 37 covering an upper side of the side wall portion 36. A lower side of the gear portion 34 has an opening.

The side wall portion 36 has an annular shape as viewed in the axial direction. Therefore, the opening on the lower side of the gear portion 34 has a circular shape. An outer circumferential surface of the side wall portion 36 corresponds to the second outer circumferential surface 32 shown in FIG. 1. An inner circumferential surface of the side wall portion 36 corresponds to the second inner circumferential surface 31 shown in FIG. 1.

As shown in FIG. 5, internal teeth 33 are formed on the second inner circumferential surface 31 of the side wall portion 36 along the circumference. As shown in FIG. 3, the gear portion 34 is disposed so as to cover the external teeth 23 of the flexspline 20. The internal teeth 33 are formed at positions facing the external teeth 23 on the second inner circumferential surface 31. As described above with reference to FIG. 1, the external teeth 23 of the flexspline 20 are partially engaged with the internal teeth 33 of the circular spline 30 in accordance with the deformation of the flexspline 20 due to the rotation of the wave generator 10. Moreover, a through-hole 38 is formed at the center of the lid portion 37.

As shown in FIG. 5, the gear portion 34 is constituted by a thin-wall structure having a substantially uniform thickness. The specific thicknesses of the side wall portion 36 and the lid portion 37 are not limited and may be designed as appropriate such that sink marks do not occur at the time of molding as injection molding. It should be noted that the thin-wall structure having a substantially uniform thickness is, in other words, a structure not including a thick-wall portion which causes the occurrence of sink marks at the time of molding. That is, the thickness of each portion does not need to be completely uniform and may have some variations unless sink marks occur. In any case, the configuration in which the entire portion is formed of a thin-wall structure is included in the thin-wall structure.

The support portion 35 is formed outside the gear portion 34 (radially outside as viewed from the rotation shaft 3) so as to surround the gear portion 34. The support portion 35 is formed using the rotation shaft 3 as the center and includes a bottom portion 39, a side wall portion 40, screw hole portions 41, and an engaging portion 42.

As shown in FIG. 5, the bottom portion 39 has an annular shape as viewed in the axial direction and is configured to extend outwardly from the lower end of the side wall portion 36 of the gear portion 34. A recess portion 43 in which the reinforcement member 60 is disposed is formed at a position at which the bottom portion 39 and the side wall portion 40 are connected to each other.

As shown in FIG. 5, in each of portions in which the screw hole portions 41 are formed, the recess portion 43 is formed by the side surface of the screw hole portion 41, the surface of the bottom portion 39, and the second outer circumferential surface 32 of the side wall portion 36 of the gear portion 34. In each of portions in which the screw hole portions 41 are not formed, the recess portion 43 is formed by a cut-out portion 44 formed in the bottom portion 39, and the second outer circumferential surface 32 of the side wall portion 36 of the gear portion 34.

The side wall portion 40 has an annular shape as viewed in the axial direction and is formed so as to extend in the axial direction from an edge portion of the bottom portion 39. The side wall portion 36 of the gear portion 34 and the side wall portion 40 of the support portion 35 are spaced apart from each other, and the side wall portions 36 and 40 and the bottom portion 39 realizes a recess structure. It should be noted that the recess portion 43 in which the reinforcement member 60 is disposed is formed in an annular shape along the second outer circumferential surface 32 of the side wall portion of the gear mechanism in the recess structure.

Regarding the screw holes 41, four screw holes 41 are formed at intervals of 90 degrees in the recess structure between the side wall portion 36 of the gear portion 34 and the side wall portion 40 of the support portion 35.

The engaging portion 42 is formed on the lower side of the bottom portion 39 of the support portion 35 so as to extend in the axial direction. The engaging portion 42 has an annular shape as viewed in the axial direction and is formed in an annular shape on the lower side of the recess portion 43 in which the reinforcement member 60 is disposed.

As shown in FIG. 5, as in the gear portion 34, the support portion 35 is constituted by a thin-wall structure having a substantially uniform thickness. That is, in this embodiment, the entire circular spline 30 is constituted by a thin-wall structure not including a thick-wall portion.

In this embodiment, the gear portion 34 and the support portion 35 are integrally formed by injection molding with resin. The resin material is not limited and any resin material may be used. For example, a resin material such as engineering plastic or super engineering plastic may be used. For example, the resin material is selected as appropriate in accordance with use conditions such as temperature at which the circular spline 30 is used and revolutions per minute.

In this embodiment, the side wall portion 36 and the bottom portion 39 of the gear portion 34 realize the second base portion. Moreover, a second gear is realized by the circular spline 30 including the gear portion 34 and the support portion 35.

As shown in FIG. 3, the positions of the screw hole portions 41 of the circular spline 30 are aligned with the screw holes 53 formed in the upper surface of the side wall portion 51 of the base portion 50. The support portion 35 of the circular spline 30 is placed on the upper surface of the side wall portion 51 of the base portion 50. Moreover, the surface of the inner circumferential side of the side wall portion 51 of the base portion 50 and the engaging portion 42 of the circular spline 30 are brought into contact with each other.

Accordingly, the circular spline 30 is mounted on the base portion 50 so as to cover the flexspline 20 and the wave generator 10 from above. By fastening screws to the four screw holes 53, the circular spline 30 is sufficiently fixed.

It should be noted that the first shaft portion 5 connected to the upper side of the wave generator 10 penetrates the through-hole 38 formed at the center of the lid portion 37 of the gear portion 34 of the circular spline 30. The first shaft portion 5 is rotatably supported to the circular spline 30 through a bearing portion 46 provided in the through-hole 38.

Figure 6:
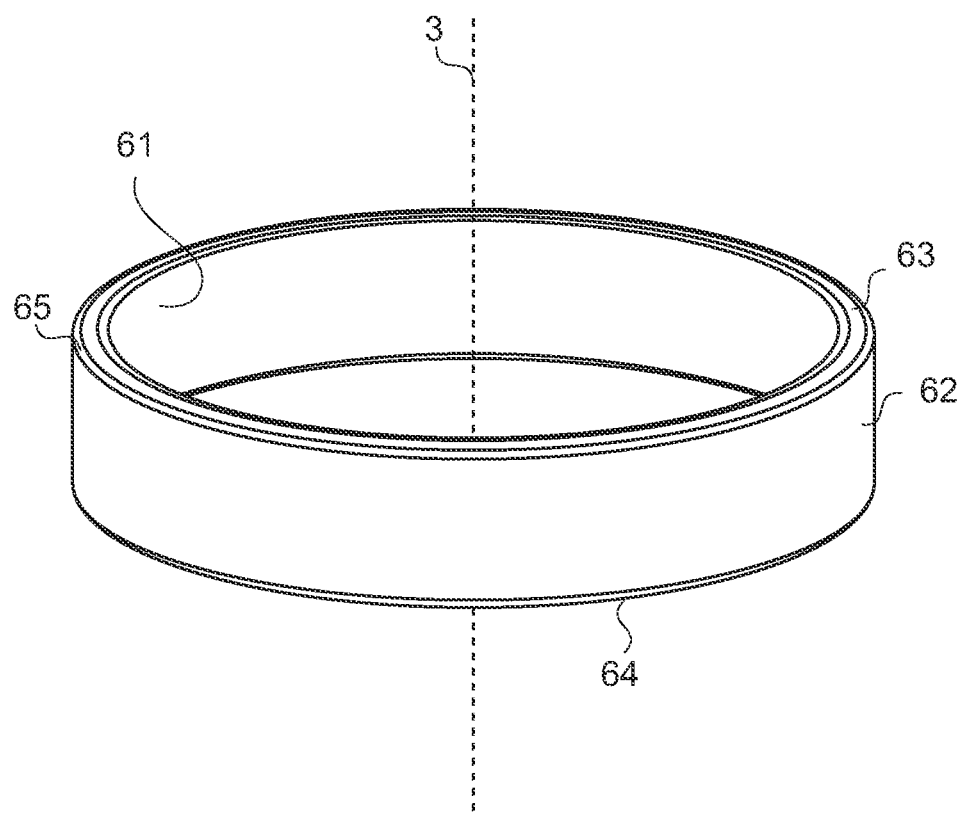
FIG. 6 A perspective view showing a configuration example of a reinforcement member.
Figure 7:
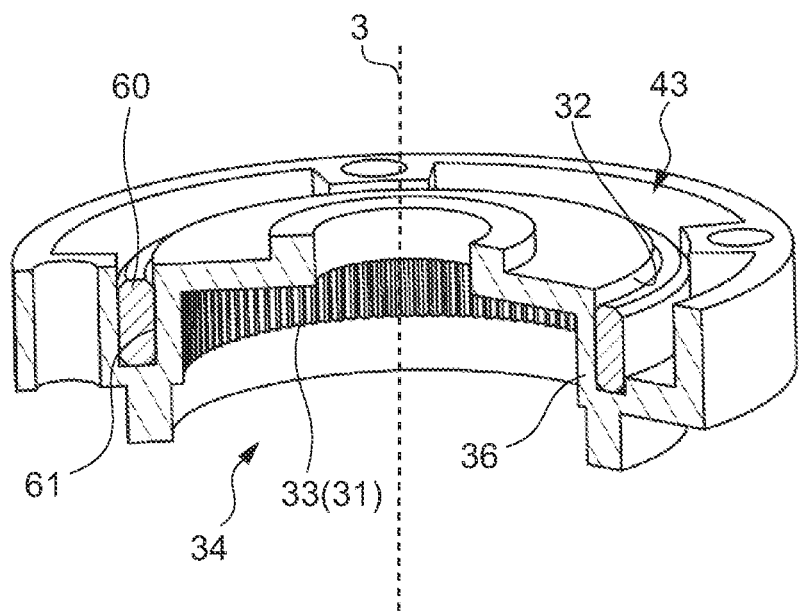
FIG. 7 A schematic diagram showing a state in which the reinforcement member is mounted on the circular spline.

FIG. 6 is a perspective view showing a configuration example of the reinforcement member 60. FIG. 7 is a schematic diagram showing a state in which the reinforcement member 60 is mounted on the circular spline 30.

The reinforcement member 60 has a ring shape formed using the rotation shaft 3 as the center. Thus, the shape of the reinforcement member 60 as viewed in the axial direction is an annular shape. The reinforcement member 60 includes an inner circumferential surface 61, an outer circumferential surface 62, an upper surface 63, and a lower surface 64. As shown in FIG. 6, tapered surfaces 65 are formed at four corner portions at which the inner circumferential surface 61 and the outer circumferential surface 62 are and the upper surface 63 and the lower surface 64 are connected to one another. Accordingly, mounting of the reinforcement member 60 to the circular spline 30 is facilitated, and high workability is provided.

As shown in FIG. 7, the reinforcement member 60 is fitted in the recess portion 43 formed in a connecting portion between the gear portion 34 and the support portion 35 of the circular spline 30 so as to surround the gear portion 34. Specifically, the reinforcement member 60 is disposed in an annular shape such that the inner circumferential surface 61 of the reinforcement member 60 is held in contact with the second outer circumferential surface 32 of the side wall portion 36.

Moreover, the reinforcement member 60 is disposed in contact with a region of the second outer circumferential surface 32 corresponding to a region in which the internal teeth 33 of the second inner circumferential surface 31 of the side wall portion 36 are formed. Specifically, the reinforcement member 60 is disposed in an annular shape outside a region in which the internal teeth 33 of the second inner circumferential surface 31 of the side wall portion 36 are formed so as to cover the second outer circumferential surface 32. As shown in FIG. 6, the reinforcement member 60 having a width substantially equal to the width of the internal teeth 33 in the axial direction is formed. The reinforcement member 60 is disposed so as to be held in contact with substantially an entire area as the area in which the internal teeth 33 are formed is projected onto the second outer circumferential surface 32.

Accordingly, it is possible to sufficiently enhance the rigidity of the side wall portion 36 in which the internal teeth 33 of the circular spline 30 are formed. As a result, it is possible to sufficiently prevent the influence of radially outward stress generated by the engagement between the external teeth 23 of the flexspline 20 and the internal teeth 33 of the circular spline 30. For example, it is possible to sufficiently prevent the side wall portion 36 of the gear portion 34 from being deformed due to the radially outward stress. Accordingly, it is possible to provide high driving torque and high rotational accuracy.

The reinforcement member 60 is formed from a material having higher rigidity than that of the circular spline 30 made of resin. Examples of such a material can include metals such as copper, aluminum, and iron and ceramics. As a matter of course, the present technology is not limited to these materials, and any material having higher rigidity than that of the circular spline 30 may be used. For example, a resin material having high rigidity may be used.

Figure 8:
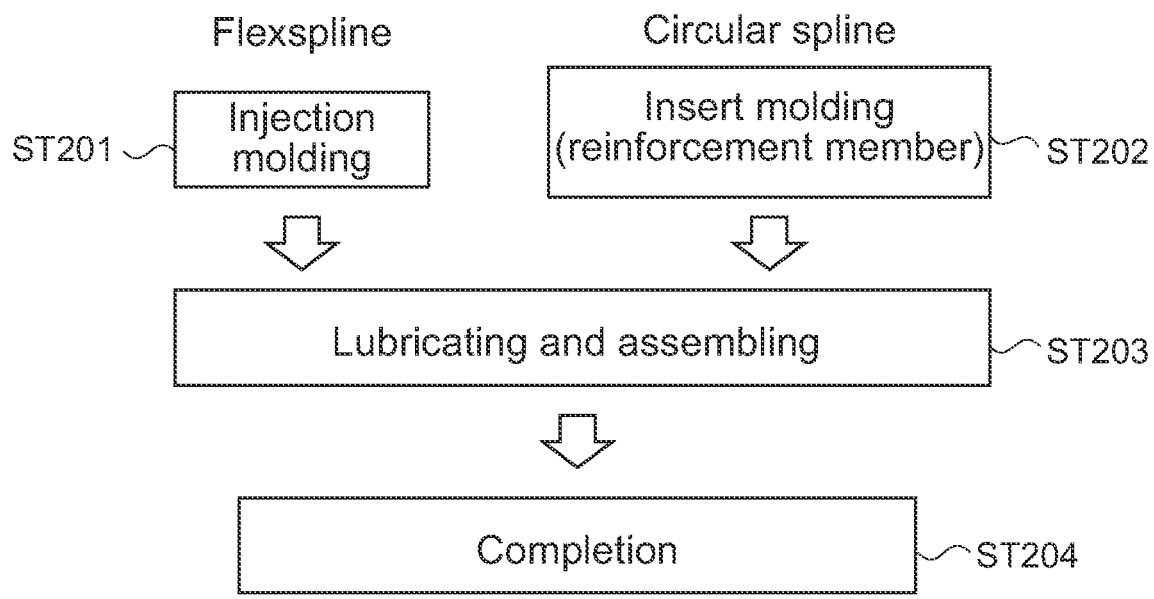
FIG. 8 A schematic flowchart showing an example of a manufacturing method for a wave speed reducer.

FIG. 8 is a schematic flowchart showing an example of a manufacturing method for the wave speed reducer 100.

In Step 201, the flexspline 20 is formed by injection molding. The injection molding is a method of performing molding by injecting a heated and melted material (resin) into a mold and cooling and solidifying the material. In this embodiment, the flexspline 20 is formed by injection molding with resin.

In Step 202, the circular spline 30 and the reinforcement member 60 are integrally formed by insert molding. The insert molding is a method of forming a molded product in which a part is integrated by injecting resin around the part fitted in a predetermined position in a mold and cooling and solidifying the resin. In this embodiment, insert molding is performed in a state in which the reinforcement member 60 is fitted in the mold of the circular spline 30.

Accordingly, by insert molding with resin, the circular spline 30 and the reinforcement member 60 disposed in contact with the outside of the region in which the internal teeth 33 of the circular spline 30 are formed are integrally formed.

It should be noted that the methods of forming the flexspline 20 and the circular spline 30 are not limited. Forming methods suitable for the materials and the like of the flexspline 20 and the circular spline 30 may be employed as appropriate.

In Step 203, lubricating and assembling of the formed flexspline 20 and circular spline 30 (reinforcement member 60) and the wave generator 10 are performed. The lubrication is a process performed to uses lubricant on a frictional surface on which the teeth of the gears mesh with each other, to thereby prevent direct contact of the frictional surface for reducing friction and wear.

It should be noted that the lubricating method and the material of lubricating oil are not limited. It is sufficient to employ a lubrication method suitable for the operation conditions such as circumferential speed and the revolutions per minute of the gears. Moreover, lubricating oil suitable for a load applied to the gears, surrounding moisture, or the like may be used as appropriate. It should be noted that the lubrication may be omitted in a case where the gears are operated under conditions such as low speed and a low load or the like.

The order and the like of assembling the respective parts, the specific assembling method and the like at the time of assembling are not limited, and may be arbitrarily set.

The wave speed reducer 100 is completed by assembling the wave generator 10, the flexspline 20, and the circular spline 30 by performing the above-mentioned Steps 201 to 203 (Step 204).

Figure 9:
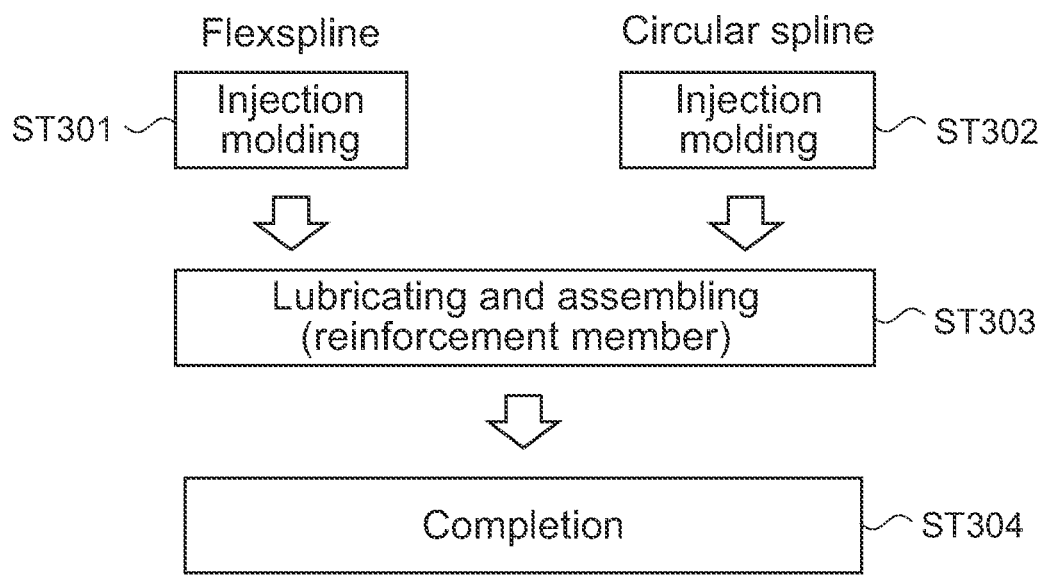
FIG. 9 A schematic flowchart showing another example of the manufacturing method for a wave speed reducer.

FIG. 9 is a schematic flowchart showing another example of the manufacturing method for the wave speed reducer 100.

In Steps 301 and 302, the flexspline 20 and the circular spline 30 are respectively formed by injection molding with resin. In Step 303, lubricating and assembling of the formed flexspline 20 and circular spline 30 and the wave generator 10 are performed.

In the assembling process, the reinforcement member 60 is mounted on the circular spline 30. For example, after the reinforcement member 60 is mounted on the circular spline 30, the circular spline 30 is mounted on the base portion 50. Alternatively, the reinforcement member 60 may be mounted on the circular spline 30 after the circular spline 30 is mounted on the base portion 50.

The order of assembling the respective parts and the specific assembling method at the time of this assembling are not limited, and may be arbitrarily set.

By performing the above-mentioned Steps 301 to 303 and assembling the wave generator 10, flexspline 20, and circular spline 30, the wave speed reducer 100 is completed (Step 304).

Figure 10:
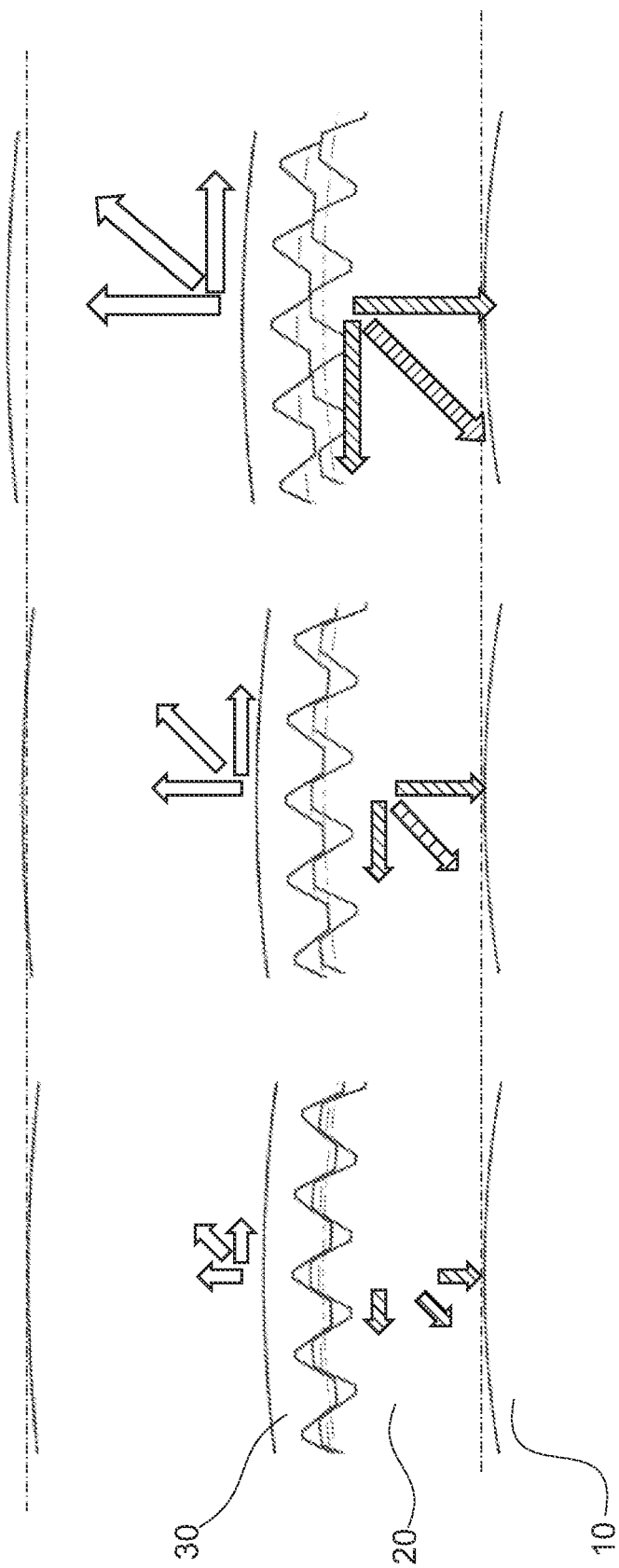
FIGS. 10A, 10B, and 10C A schematic diagram showing a cause of the occurrence of ratcheting (jumping teeth) in the wave speed reducer.

FIGS. 10A, 10B, and 10C are schematic diagrams showing a cause of the occurrence of ratcheting (jumping teeth) in the wave speed reducer 100. FIG. 10A is a diagram showing a state in which proper torque is applied to each gear. FIG. 10B is a diagram showing a state in which the maximum rating and instantaneous maximum torque are applied to the gears. FIG. 10C is a diagram showing a state in which ratcheting occurs.

The ratcheting is a phenomenon in which meshing teeth of the flexspline 20 and the circular spline 30 are displaced, which occurs in a case where an overload is applied during rotation of the wave generator 10. The torque when the ratcheting occurs in this case will be referred to as ratcheting torque.

As shown in FIGS. 10A to C, 10B, and 10C, in each state, meshing of the external teeth 23 with the internal teeth 33 generates stress in accordance with rotation of the wave generator 10. In the state shown in FIG. 10A, the generated stress is small, and the flexspline 20 and the circular spline 30 can sufficiently resist the stress in terms of the design. In this case, the ratcheting does not occur and each gear is normally driven.

In the state shown in FIG. 10B, the stress applied to the flexspline 20 and the circular spline 30 is substantially equal to the maximum rating. The maximum rating is a condition that should not exceed a set use condition for each part or the like. In a case where force (torque) applied to the flexspline 20 and the circular spline 30 exceeds the maximum rating, ratcheting occurs.

In the state shown in FIG. 10C, the teeth of the flexspline 20 and the circular spline 30 ride over each other and ratcheting occurs because the generated stress exceeds the maximum rating.

As the cause of the occurrence of ratcheting, elastic deformation of the circular spline 30 by torque can be exemplified. For example, when the gears are rotationally driven, outward stress is generated in the portion in which the teeth of the flexspline 20 meshes with the teeth of the circular spline 30. In a case where the circular spline 30 is elastically deformed by the generated stress, the teeth are shallowly engaged with each other, and ratcheting occurs.

Therefore, it is important to suppress the elastic deformation of the circular spline 30 for preventing the occurrence of ratcheting. That is, it is necessary to increase the rigidity of the circular spline 30.

Figure 11:
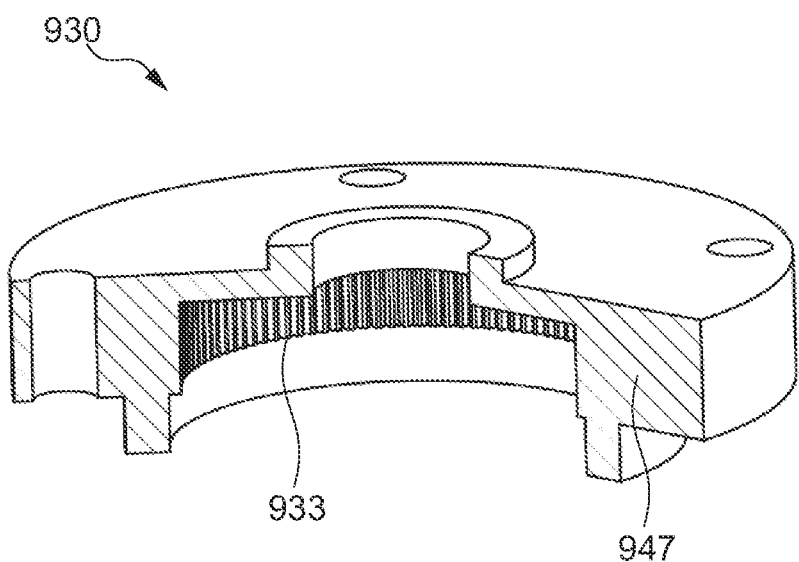
FIG. 11 A schematic diagram showing a configuration example of an circular spline shown as a comparative example.

FIG. 11 is a schematic diagram showing a configuration example of a circular spline 930 shown as a comparative example. In this circular spline 930, the outside of a region in which the internal teeth 933 are formed is filled with resin in order to increase the rigidity. That is, a thick-wall structure 947 is realized instead of the recess structure of the circular spline 930 according to this embodiment shown in FIG. 5. The thick-wall structure 947 corresponds to a state in which the recess structure shown in FIG. 5 is filled with resin. By realizing the thick-wall structure 947, the rigidity of the circular spline 930 is increased.

In a case of realizing the thick-wall structure 947, a problem arises when molding the circular spline 930. For example, in injection molding, resin is heated to a melting point or higher to be liquefied and injected into a mold. By cooling and solidifying the injected resin, it is possible to take out a desired shape.

However, since the resin is cooled by lowering the temperature of the mold, it solidifies from the surface in contact with the mold and then solidifies inside. Therefore, a temperature difference occurs between the surface and the inside of the resin. Moreover, since the resin contracts with cooling, the surface is pulled inward by the contraction when the inside is finally cooled, and sink marks (recesses) are generated.

Therefore, in a case where the thick-wall structure 947 shown in FIG. 8 is employed, there is a very high possibility that sink marks will be generated at the time of injection molding. As a result, the shape accuracy of the circular spline 930 is significantly lowered, causing the driving torque unevenness of the gears, and also the rotation accuracy is significantly lowered. It can also cause ratcheting as described above.

In this embodiment, as shown in FIG. 5, a recess structure is realized by the side wall portions 36 and 40 and the bottom portion 39. Then, the entire circular spline 30 including the gear portion 34 and the support portion 35 is constituted by a thin-wall structure having a substantially uniform thickness. That is, the recess structure can realize downgage (make the part thinner). Accordingly, it is possible to sufficiently suppress the generation of sink marks at the time of injection molding and to provide extremely high shape accuracy. As a result, it is possible to realize high driving torque and high rotational accuracy.

As described above, in the wave speed reducer 100 according to this embodiment, the reinforcement member 60 is provided on the second outer circumferential surface 32 of the gear portion 34 of the circular spline 30. The reinforcement member 60 is disposed in contact with the region of the second outer circumferential surface 32 corresponding to the region in which the internal teeth 33 of the second inner circumferential surface 31 are formed. Accordingly, it is possible to provide high driving torque and high rotational accuracy.

Since the circular spline 30 has the recess portion 43 and the thickness of the second base portion and the thickness of the support portion 35 are substantially equal, it is possible to reduce sink marks at the time of molding.

Moreover, since the reinforcement member 60 having higher rigidity than that of the circular spline 30 is fitted into the recess portion 43 of the circular spline 30, the rigidity of the circular spline 30 can be enhanced. Accordingly, circumferential expansion of the circular spline 30 is corrected to be reduced. As a result, it is possible to suppress the occurrence of the ratcheting in the wave speed reducer 100.

The use of insert molding during the manufacture of the circular spline 30 can reduce the number of manufacturing steps. Accordingly, it is possible to reduce the time and cost for the manufacturing method.

Moreover, in this embodiment, the flexspline 20 and the circular spline 30 are made of resin. Accordingly, as compared to the metal, it is unnecessary to cut each of parts, it takes lower cost, and the manufacture can be conducted in a shorter time.

Second Embodiment

A wave speed reducer according to a second embodiment of the present technology will be described. In the following description, descriptions of portions similar to the configurations and effects in the wave speed reducer 100 described in the embodiment above will be omitted or simplified.

Figure 12:
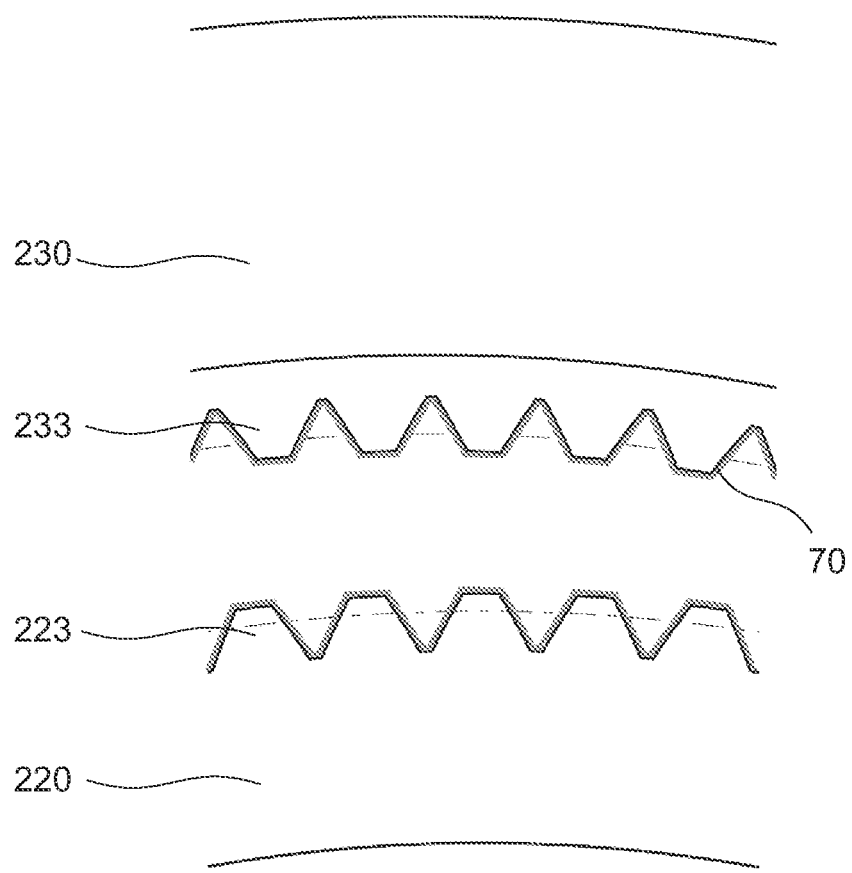
FIG. 12 A schematic diagram showing a surface of a flexspline and a circular spline according to a second embodiment.

FIG. 12 is a schematic diagram showing surfaces of a flexspline and a circular spline according to this embodiment. A flexspline 220 and a circular spline 230 according to this embodiment have a plating layer 70 formed on the surface.

In this embodiment, the flexspline 220 and the circular spline 230 are made of resin. Therefore, as compared to the case where the flexspline 220 and the circular spline 230 are made of metal, the rigidity, waterproofness, strength, hardness, wear resistance, heat resistance, and thermal conductivity, and the like are often lower.

Examples of resin used for the flexspline 220 and the circular spline 230 can include polyacetal (POM) that is engineering plastic. As a matter of course, the present technology is not limited thereto, and polyether ether ketone (PEEK) or the like that is super engineering plastic may be used.

For example, in a case of a gear using the POM, dimensional stability is good because of its low water absorbability. Moreover, it also has features that it is excellent in wear resistance and sliding property and the like. In a case of a gear using the PEEK, it has features that it is excellent in heat resistance, mechanical strength, and the like and that it does not undergo hydrolysis even in high-temperature steam, for example.

In this embodiment, by forming the plating layer on the surfaces of the flexspline 220 and the circular spline 230, the rigidity, waterproofness, strength, hardness, wear resistance, heat resistance, and thermal conductivity, and the like are enhanced. An electroless plating layer or an electroplating layer, for example, is formed as the plating layer 70. As a matter of course, the present technology is not limited thereto.

Electroless plating is a treatment method of placing the flexspline 220 and the circular spline 230 in a solution containing metal wished to be made to adhere as a plating, causing a reaction on the surface, and chemically reducing and precipitating the metal.

For example, Teflon electroless nickel plating can enhance the frictionality, water repellency, mold releasability, and the like. Electroless nickel plating can enhance the wear resistance, corrosion resistance, and the like.

Electroplating is a treatment method for electrochemically precipitating metal wished to be made to adhere as a plating. For example, zinc plating or electro nickel plating is excellent in corrosion resistance and dimensional accuracy. In a case of alumite plating or hard chrome plating, it is possible to enhance water repellency, abrasion resistance, and the like.

The type, position, treatment, and the like of the plating formed on the surfaces of the flexspline 220 and circular spline 230 are not limited. For example, the plating may be formed by chemical conversion treatment, anodization treatment, or the like. Alternatively, the plating may be formed only on external teeth 233 and internal teeth 223 of the flexspline 220 and the circular spline 230 or the plating may be formed on either the flexspline 220 or circular spline 230.

Moreover, rather than forming only the electroless plating and the electroplating, the electroless plating is used as a conductive layer and the plating of the flexspline 220 and circular spline 230 may be treated by electroforming or the like. Electroforming is a technique of electrodepositing electrolyzed metal ions with a necessary thickness on the surface of a model having a desired shape such that the shape and surface irregularities of the model are reproduced.

Accordingly, it is possible to enhance the rigidity, waterproofness, strength, hardness, wear resistance, heat resistance, and thermal conductivity, and the like and it is also possible to shorten the treatment time because the growth of the plating is faster than the electroless plating.

Moreover, for example, the plating layer formed on the surfaces of the flexspline 220 and the circular spline 230 may have a laminated structure by electroless plating, electroplating, or the like. For example, an adhesive conductive layer may be formed of nickel, a soft layer may be formed of copper, and a lubricant hardened layer may be formed of Teflon nickel on the top surface. In this case, it is possible to form a laminated plating having favorable adhesiveness, flexibility, surface hardness, durability, and the like.

Figure 13:
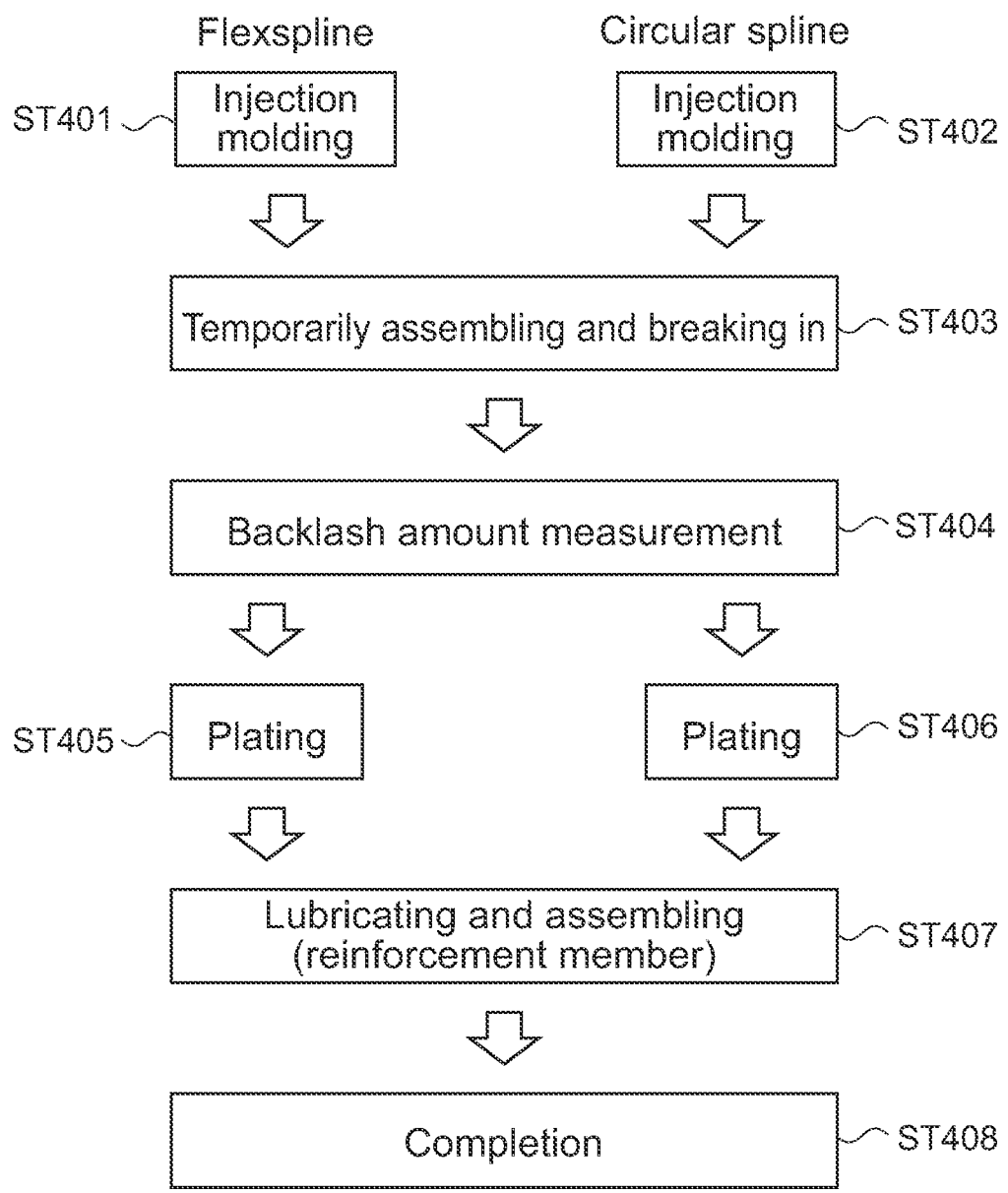
FIG. 13 A schematic flowchart showing an example of a manufacturing method for a wave speed reducer.

FIG. 13 is a schematic flowchart showing an example of a manufacturing method for the wave speed reducer according to this embodiment.

In Steps 401 and 402, the flexspline 220 and the circular spline 230 are each formed by injection molding with resin. In Step 403, the formed flexspline 220 and circular spline 230 and a wave generator are temporarily assembled and driven. Specifically, grease containing abrasive is made to adhere to the tooth face of each tooth, and the formed flexspline 220 and circular spline 230 and the wave generator are temporarily assembled and broken in.

By breaking in, the tooth face to which the grease has been applied rubs a rough surface with burrs and the like generated by molding or the like, which can make the contact and adaptability of the tooth faces better. Stains on the tooth faces, including the grease and the like, are removed by cleaning and degreasing.

In Step 404, the amount of backlash corresponding to a reduction of the teeth worn by the abrasive is measured. That is, the backlash between the flexspline 220 and the circular spline 230 is measured.

It should be noted that the backlash refers to a gap when gears in pair are made to mesh with each other for rotating smoothly and normally. Moreover, the backlash increases due to wear, which can cause vibration and noise and shorten the life time of the gears.

In Steps 405 and 406, the plating layer 70 having a thickness substantially equal to the measured amount of backlash is formed for each of the flexspline 220 and the circular spline 230. For example, the plating is formed with a thickness of 0.1 to 100 µm, for example, in accordance with the measurement value of the amount of backlash.

As described above, in this embodiment, the plating thickness is determined on the basis of the measurement result of the backlash and the flexspline 220 and the circular spline 230 are plated. Accordingly, by plating with the amount substantially equal to the amount of backlash, it is possible to reduce the wear of the gears at the time of driving. As a result, it is possible to suppress the reduction of the generation and the life of the gears of vibration and noise. It should be noted that it may be formed plating by adding the thickness of the pressure portion applied to the gears in addition to the backlash amount.

In Step 407, the formed flexspline 220 and circular spline 230 and the wave generator are lubricated and assembled. At this time, the reinforcement member is mounted on the circular spline 230. That is, the reinforcement member is disposed in contact with the outside of the region in which the internal teeth 233 of the circular spline 230 are formed.

The wave speed reducer is completed by performing the above-mentioned Steps 401 to 407 and assembling the wave generator, the flexspline 220, and the circular spline 230 (Step 407).

As described above, in the wave speed reducer according to this embodiment, the plating layer 70 is formed on the surfaces of the flexspline 220 and the circular spline 230.

Accordingly, a wave speed reducer having higher performance and higher accuracy can be manufactured by plating the gears made of resin as compared to a case of molding only with resin.

By forming these platings on the gear surface, the rigidity, waterproofness, strength, hardness, wear resistance, heat resistance, and thermal conductivity, and the like can be enhanced. In particular, in a case where the entire flexspline 220 and the entire circular spline 230 are coated with a plating having higher thermal conductivity than that of the resin, heat generated by the gear portions efficiently transfer through the top surface coating. Thus, it is possible to prevent overheating of the gears, and it is possible to use the gears even in an environment such as a higher load and higher revolutions per minute.

It should be noted that the plating layer may be formed on only one of the circular spline 220 or the flexspline 230. Even in this case, it is possible to determine the thickness of the plating layer on the basis of the measurement result of backlash, for example. Alternatively, plating step may be performed after the circular spline 230 and the reinforcement member are integrally formed by insert molding. In this case, a plating layer may be formed on the surface of the reinforcement member.

Other Embodiments

The present technology is not limited to the embodiments described above, and various other embodiments can be made.

Figure 14:
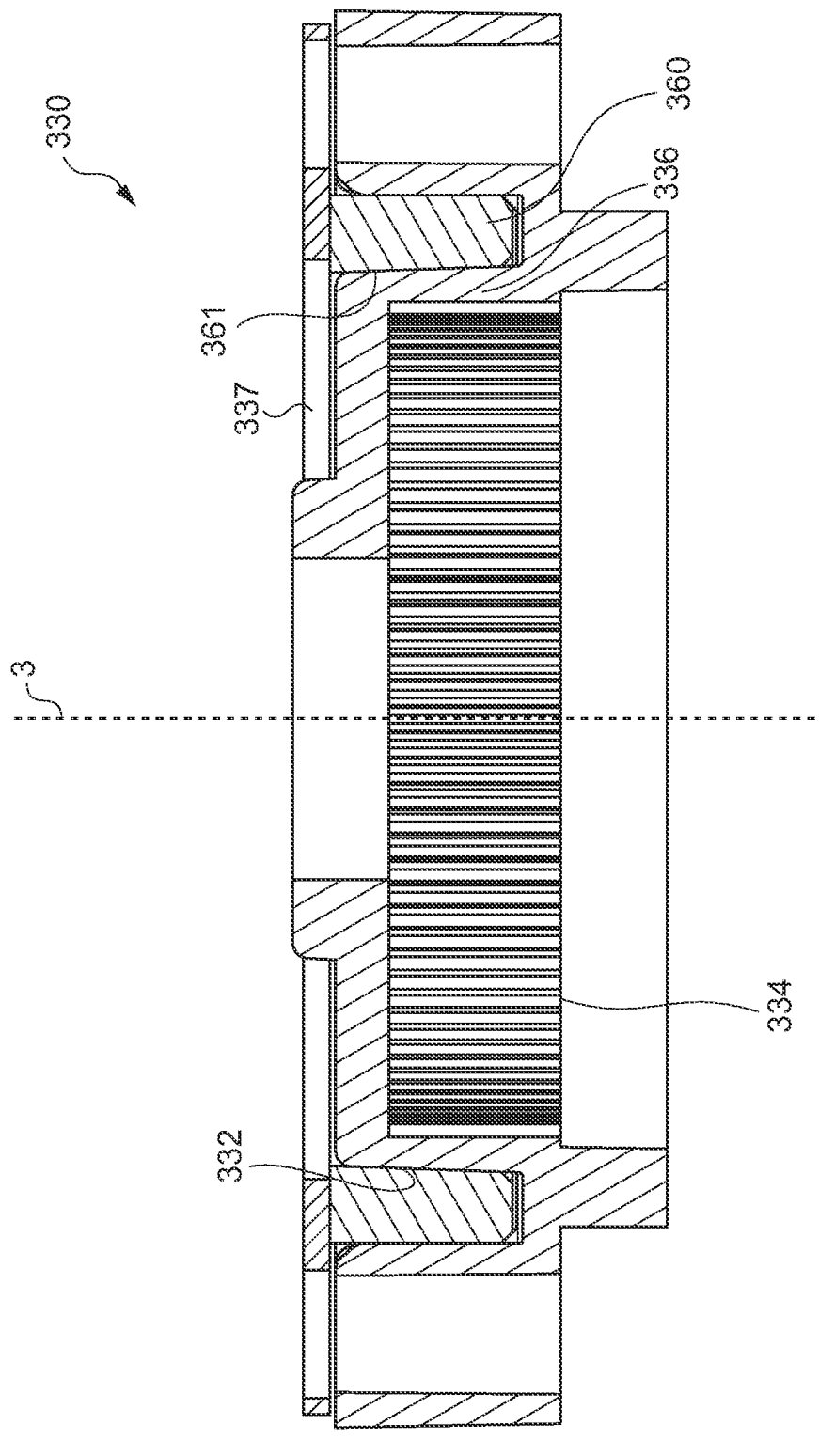
FIG. 14 A schematic diagram showing a configuration example of a circular spline according to another embodiment.

FIG. 14 is a schematic diagram showing a configuration example of a circular spline according to another embodiment. In a circular spline 330 according to this embodiment, a second outer circumferential surface 332 of a side wall portion 336 of a gear portion 334 is formed obliquely. Specifically, the second outer circumferential surface 332 is configured to be oblique to be closer to a rotation shaft 3 as it approaches a lid portion 337 of the gear portion 334. Thus, the second outer circumferential surface 332 is an annular tapered surface that gradually decreases in diameter as it approaches the lid portion 337.

Thus, so-called draft is achieved by configuring the second outer circumferential surface 332 of the side wall portion 336 of the gear portion 334 to be oblique, and the molded product can be smoothly released from the mold at the time of injection molding. As a result, it is possible to make the workability for the manufacture of the wave speed reducer very high.

As shown in FIG. 14, an inner circumferential surface 361 of a reinforcement member 360 is a tapered surface, corresponding to the second outer circumferential surface 332 of the side wall portion 336. Since the tapered surface (inner circumferential surface 361) of this reinforcement member 360 is brought into contact with the second outer circumferential surface 332 configured to be oblique, the rigidity of the circular spline 330 is increased.

It should be noted that in the example shown in FIG. 14, the lid portion 337 is mounted so as to press the reinforcement member from above. Accordingly, in accordance with the tilt of the second outer circumferential surface 332 of the side wall portion 336, it is possible to prevent the reinforcement member 360 from being moved upward. It should be noted that the lid portion 337 is not necessarily required.

In this manner, in a case where a gradient is formed in the side wall portion of the second base portion, the reinforcement member 360 may have a tapered surface having the same slope as the side wall portion. Accordingly, it is possible to adjust the force for compressing the circular spline 330 by the engagement of the tapered surface.

The example in which both the flexspline and the circular spline are made of resin has been described above. The present technology is not limited thereto, and either the flexspline or circular spline may be made of resin. For example, by forming either the flexspline or circular spline from metal, it is possible to reduce the influence of heat generated in driving of the gears.

In the above description, the reinforcement member having an annular shape closed at 360 degrees is used as the reinforcement member disposed in an annular shape around the gear portion. The present technology is not limited thereto, and for example, in the case where the reinforcement member is formed of a member having very high rigidity, a reinforcement member which is not completely annular and has a partial cutout may be used. That is, in the present disclosure, to be disposed in an annular shape is not limited to a case where the reinforcement member is entirely disposed at 360 degrees and also includes a case where a partial portion of the reinforcement member is not disposed.

The respective configurations including the wave speed reducer, the wave generator, the flexspline, the circular spline, the reinforcement member, and the like, the manufacturing flow of the wave speed reducer, and the like described with reference to the drawings are merely one embodiment, and can be arbitrarily modified without departing from the gist of the present technology. That is, any other configuration, manufacturing flow, and the like for carrying out the present technology may be employed.

In the present disclosure, "center", "uniform", "equal", "elliptical", "circular", "cylindrical", and the like may include the concepts of "substantially center", "substantially uniform", "substantially equal", "substantially elliptical", "substantially circular", "substantially cylindrical", and the like, as well as the concepts of "completely center", "completely uniform", "completely equal", "completely elliptical", "completely circular", "completely cylindrical", and the like.

On the other hand, in the present disclosure, the expression using "substantially" such as "substantially uniform" and "substantially equal" has a concept meaning a predetermined range (e.g., range of ±10%) based on "completely uniform", "completely equal", or the like. Those can also be simply expressed as "uniform" or "equal" with "substantially" omitted. That is, in the present disclosure, there is no special difference between the expression with "substantially" and the expression without "substantially".

At least two of the features according to the present technology described above may be combined. In other words, various features described in the respective embodiments may be arbitrarily combined across the embodiments. Further, the various effects described above are merely illustrative, not limitative, and other effects may be provided.

It should be noted that the present technology can also take the following configurations.

(1) A gear wheel mechanism, including:
a rotator that is configured to be rotatable about a rotation shaft and has an elliptical shape as viewed in an axis direction of the rotation shaft;
a first gear wheel including
a first base portion including a first outer circumferential surface and a first inner circumferential surface and having a hollow cylindrical shape configured to be deformable by the rotator being inserted in the axis direction of the rotation shaft and
external teeth formed in the outer circumferential surface;
a second gear wheel including
a second base portion including a second outer circumferential surface and a second inner circumferential surface and having a hollow cylindrical shape disposed to cover the external teeth and
internal teeth which are formed at positions facing the external teeth of the second inner circumferential surface, with which the external teeth are partially engaged in accordance with deformation of the first base portion by rotation of the rotator; and
a reinforcement member that is disposed in contact with a region of the second outer circumferential surface corresponding to a region in which the internal teeth of the second inner circumferential surface are formed.

(2) The gear wheel mechanism according to (1), in which
the rotator includes a wave generator,
the first gear wheel includes a flexspline, and
the second gear wheel includes a circular spline.

(3) The gear wheel mechanism according to (1) or (2), in which
at least one of the first gear wheel or the second gear wheel includes resin.

(4) The gear wheel mechanism according to any one of (1) to (3), in which
the reinforcement member is disposed in an annular shape outside the region in which the internal teeth of the second inner circumferential surface are formed, so as to surround the second outer circumferential surface.

(5) The gear wheel mechanism according to any one of (1) to (4), in which
the reinforcement member has an annular shape as viewed in the axis direction of the rotation shaft.

(6) The gear wheel mechanism according to any one of (1) to (5), in which
the reinforcement member has rigidity higher than rigidity of the second gear wheel.

(7) The gear wheel mechanism according to any one of (1) to (6), in which
the reinforcement member is metal or ceramic.

(8) The gear wheel mechanism according to any one of (1) to (7), in which
the second gear wheel includes a support portion that is configured integrally with the second base portion and forms a recess portion in which the reinforcement member is disposed.

(9) The gear wheel mechanism according to any one of (1) to (8), in which
the second gear wheel is constituted by a thin-wall structure having a substantially uniform thickness.

(10) The gear wheel mechanism according to any one of (1) to (9), in which
at least one of the first gear wheel or the second gear wheel includes a plating layer formed on a surface.

(11) The gear wheel mechanism according to (10), in which
the plating layer includes at least one of an electroless plating layer or an electroplating layer.

(12) The gear wheel mechanism according to (1), in which
the second base portion includes
a side wall portion having an annular shape as viewed in the axis direction of the rotation shaft and
a lid portion that covers the side wall portion,
the internal teeth are formed in an inner circumferential surface of the side wall portion,
the reinforcement member is held in contact with an outer circumferential surface of the side wall portion,
the outer circumferential surface of the side wall portion is configured to be oblique so as to be closer to the rotation shaft as the outer circumferential surface approaches the lid portion, and
the reinforcement member includes a tapered surface that is brought into contact with the outer circumferential surface.

(13) A manufacturing method for the gear wheel mechanism, including:
   integrally forming, by insert molding with resin, a circular spline and a reinforcement member, the reinforcement member being disposed in contact with an outside of a region in which internal teeth of the circular spline are formed; and
   assembling the circular spline with which the reinforcement member is held in contact, a wave generator, and a flexspline.
(14) The manufacturing method for the gear wheel mechanism according to (13), further including
   a step of forming the flexspline by injection molding with resin.
(15) A manufacturing method for a gear wheel mechanism, including:
   temporarily assembling a wave generator, a flexspline, and a circular spline and driving the temporarily assembled wave generator, flexspline, and circular spline;
   measuring backlash between the flexspline and the circular spline; and
   determines a plating thickness on the basis of a measurement result of the backlash and plates at least one of the flexspline or the circular spline.
(16) The manufacturing method for the gear wheel mechanism according to (15), further including:
   assembling a wave generator, a flexspline, and a circular spline after the plating step ends; and
   disposing a reinforcement member in contact with an outside of a region in which internal teeth of the circular spline are formed.

REFERENCE SIGNS LIST 3 rotation shaft
10 wave generator
20, 220 flexspline
21 first inner circumferential surface
22 first outer circumferential surface
23, 223 external teeth
30, 230, 330 circular spline
31 second inner circumferential surface
32, 332 second outer circumferential surface
33, 233 internal teeth
35 support portion
60, 360 reinforcement member
70 plating layer

The invention claimed is:
1. A gear wheel mechanism, comprising:
   a rotation shaft;
   a rotator that is configured to be rotatable about the rotation shaft, wherein the rotator has an elliptical shape as viewed in an axis direction of the rotation shaft;
   a first gear wheel including:
      a first base portion that includes a first outer circumferential surface and a first inner circumferential surface, wherein
         the first gear wheel has a hollow cylindrical shape,
         the first gear wheel is configured to be deformable by the rotator based on insertion of the rotator in the axis direction of the rotation shaft; and
      a plurality of external teeth on the first outer circumferential surface;
   a second gear wheel including:
      a second base portion that includes:
         a second outer circumferential surface and a second inner circumferential surface, wherein
            the second gear wheel has the hollow cylindrical shape, and
            the second gear wheel covers the external teeth;
         a side wall portion having an annular shape as viewed in the axis direction of the rotation shaft; and
         a lid portion that covers the side wall portion; and
         a plurality of internal teeth at a plurality of positions that faces the plurality of external teeth of the second inner circumferential surface, wherein
            the plurality of internal teeth are partially engaged with the plurality of external teeth based on deformation of the first base portion by rotation of the rotator; and
   a reinforcement member that is in contact with a region of the second outer circumferential surface corresponding to a region that includes the plurality of internal teeth of the second inner circumferential surface, wherein
      the plurality of internal teeth are on a third inner circumferential surface of the side wall portion,
      the reinforcement member is in contact with a third outer circumferential surface of the side wall portion,
      the third outer circumferential surface of the side wall portion is configured to be oblique so as to be closer to the rotation shaft based on approach of the third outer circumferential surface towards the lid portion, and
      the reinforcement member includes a tapered surface that is in contact with the third outer circumferential surface.
2. The gear wheel mechanism according to claim 1, wherein
   the rotator comprises a wave generator,
   the first gear wheel comprises a flexspline, and
   the second gear wheel comprises a circular spline.
3. The gear wheel mechanism according to claim 1, wherein at least one of the first gear wheel or the second gear wheel includes resin.
4. The gear wheel mechanism according to claim 1, wherein
   the reinforcement member is in the annular shape outside the region, and
   the region includes the plurality of internal teeth of the second inner circumferential surface so as to surround the second outer circumferential surface.
5. The gear wheel mechanism according to claim 1, wherein the reinforcement member has the annular shape as viewed in the axis direction of the rotation shaft.
6. The gear wheel mechanism according to claim 1, wherein the reinforcement member has rigidity higher than rigidity of the second gear wheel.
7. The gear wheel mechanism according to claim 1, wherein the reinforcement member is one of metal or ceramic.
8. The gear wheel mechanism according to claim 1, wherein
   the second gear wheel includes a support portion that is configured integrally with the second base portion,
   the support portion includes a recess portion, and
   the reinforcement member is in the recess portion.
9. The gear wheel mechanism according to claim 1, wherein the second gear wheel is constituted by a thin-wall structure having a substantially uniform thickness.
10. The gear wheel mechanism according to claim 1, wherein at least one of the first gear wheel or the second gear wheel includes a plating layer which is on a surface.

11. The gear wheel mechanism according to claim 10, wherein the plating layer includes at least one of an electroless plating layer or an electroplating layer.

12. A manufacturing method, comprising:
- integrally forming, by insert molding with resin, a circular spline, and a reinforcement member, wherein the reinforcement member is in contact with an outside of a region in which a plurality of internal teeth of the circular spline are formed; and
- assembling the circular spline a wave generator, and a flexspline, wherein
    - the circular spline includes a side wall portion and a lid portion that covers the side wall portion,
    - the circular spline is held in contact with the reinforcement member,
    - the reinforcement member is held in contact with an outer circumferential surface of the side wall portion,
    - the outer circumferential surface of the side wall portion of the circular spline is configured to be oblique so as to be closer to a rotation shaft as the outer circumferential surface approaches the lid portion, and
    - the reinforcement member includes a tapered surface that is brought into contact with the outer circumferential surface.

13. The manufacturing method according to claim 12, further comprising forming the flexspline by injection molding with resin.

14. A manufacturing method, comprising:
- temporarily assembling a wave generator, a flexspline, and a circular spline;
- driving the temporarily assembled wave generator, the flexspline, and the circular spline;
- measuring backlash between the flexspline and the circular spline;
- determining a plating thickness based on a measurement result of the backlash; and
- plating at least one of the flexspline or the circular spline.

15. The manufacturing method according to claim 14, further comprising:
- assembling the wave generator, the flexspline, and the circular spline after the plating ends; and
- disposing a reinforcement member in contact with an outside of a region in which a plurality of internal teeth of the circular spline are formed.

\* \* \* \* \*